No. 809,219. PATENTED JAN. 2, 1906.
R. P. PICTET.
APPARATUS FOR DEHYDRATING COMPRESSED GASES.
APPLICATION FILED JULY 25, 1903.
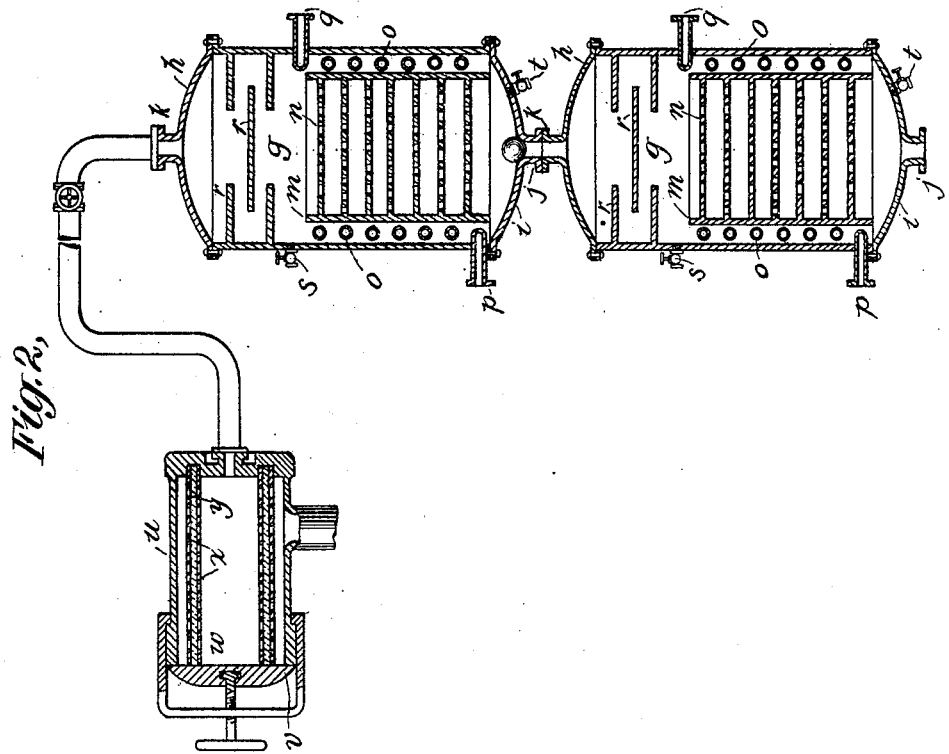
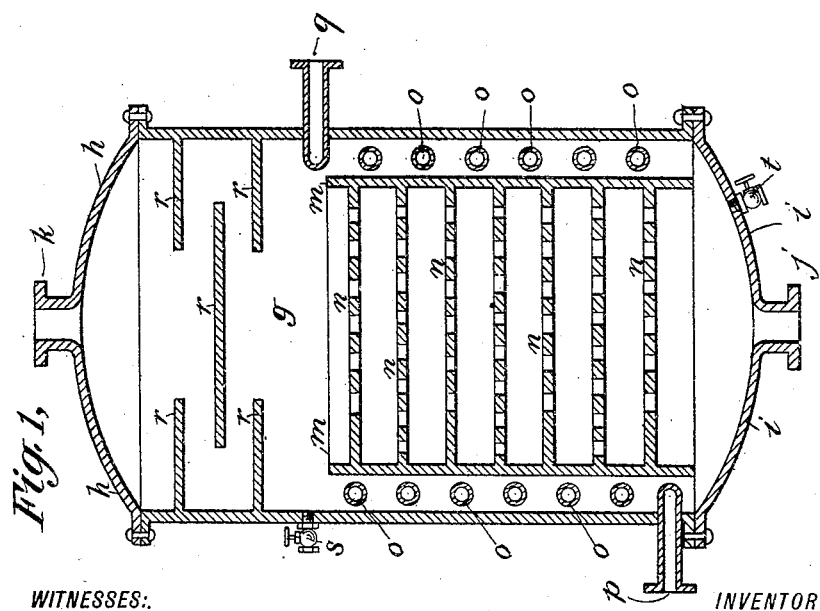
WITNESSES:
Benj. E. Peale
Harold Crockeron
INVENTOR
Raoul Pierre Pictet
BY
Chapin Haywood Marble
ATTORNEYS

UNITED STATES PATENT OFFICE.

RAOUL PIERRE PICTET, OF STEGLITZ, GERMANY.

APPARATUS FOR DEHYDRATING COMPRESSED GASES.

No. 809,219.      Specification of Letters Patent.      Patented Jan. 2, 1906.

Application filed July 25, 1903. Serial No. 166,940.

*To all whom it may concern:*

Be it known that I, RAOUL PIERRE PICTET, professor of the University of Geneva, Switzerland, and manufacturer of chloroform at Berlin, Germany, a citizen of the Canton of Geneva, in the Confederation of Switzerland, and a resident of 49 Belfortstrasse, Steglitz, near Berlin, in the Kingdom of Prussia and Empire of Germany, have invented a certain new and useful Improvement in Apparatus for Dehydrating Compressed Gases, of which the following is a specification.

The object of this invention of an improvement in apparatus for dehydrating compressed gases is the provision of apparatus in which air or other gas or gaseous mixture which, for instance, may be required to be dried before subjection to any operation—as, for example, liquefaction—is subjected to an extremely thorough drying. Such a thorough drying has proved absolutely necessary during the compression of gases, especially those to be liquefied, because the quantities of gas being compressed, often amounting to one hundred thousand cubic meters, carry large quantities of aqueous vapor with them, which condense and in some cases freeze in the pipes in which the cooling and liquefaction of the gas or gaseous mixture are to take place, and thereby stop up these pipes and render further action or use of the apparatus impossible.

In the accompanying drawings, Figure 1 shows a vertical section through one form of dehydrater constructed in accordance with my invention, and Fig. 2 is a similar section showing two such dehydraters connected in series and also showing a filter which may be used to extract ice carried with the air as it passes from said dehydraters.

The dehydrater or dehydraters which I employ may be connected to refrigerating apparatus, which may be of any suitable kind provided that the required reduction of the temperature of the gas passed through the dehydrater or dehydraters is effected.

In arranging a dehydrater according to this invention I provide a cylinder or vessel of any suitable material of strength sufficient to resist the maximum pressure to which the gas passing into the dehydrater may be compressed. Within the said cylinder or vessel a casing is supported in any suitable manner, and this casing is provided with two or more horizontal or nearly horizontal perforated plates or partitions, and in the space between the said casing and the interior surface of the wall of the cylinder or vessel is placed a coil or series of pipes through which is made to pass a suitably-cooled saline solution or any liquid not freezing or crystallizing at the low temperature which it is desired to maintain in the dehydrater or any volatile liquid which will be evaporated at such low temperature. Enough water or other liquid is placed in the cylinder or vessel to immerse the casing therein, and the gas to be dried, which has been compressed, is made to enter the cylinder or vessel aforesaid at the bottom and to pass through the casing therein, being divided in passing through the plates or partitions of the said casing, so that a very intimate contact between such gas and the water or other liquid takes place and the gas passing through the said casing reducing the density of the water or other liquid within it by change of temperature, as well as by the formation of bubbles therein, and impelling such water or other liquid mechanically causes an ample circulation of water or other liquid upward through the said casing and downward outside it and past the coil or pipes aforesaid, and thus the gas passed into the dehydrater is washed, and any water-vapor present in it is condensed to the maximum tension of water-vapor at the temperature of the liquid in the cylinder or vessel aforesaid. The gas which has been cooled and freed from water-vapor, as aforesaid, is allowed to pass through a suitable outlet at the top of the cylinder or vessel aforesaid.

Referring now to the drawings and first to Fig. 1, $g$ is a vessel or cylinder formed of metal plates, with a cover $h$ and bottom $i$ riveted thereto. The bottom of the dehydrater $g$ is provided with a flange $j$ for the connection of the pipe by means of which compressed gas is to be supplied to the dehydrater in order to be freed from water, and the top of the dehydrater is provided with a flange $k$ for the connection of the pipe by which gas is to be conducted from the dehydrater. $m$ is a casing supported in any suitable manner within the vessel or cylinder $g$ and provided with a series of horizontal perforated partitions $n$. In the interior of the vessel or cylinder $g$ and around the casing $m$ is arranged a coil $o$, formed of a pipe the ends of which pass to the outside of the vessel or cylinder $g$ and are provided with flanges $p$ $q$, by means of which the coil $o$ may be connected to the pipes by means of which the cooled saline solution or other liquid aforesaid may be led to and from it. In the upper part of the vessel or cylinder $g$ are arranged baffle-plates $r$, placed so that the compressed gas passing upward through the dehydrater will be compelled to take an indirect course. The vessel or cylinder $g$ is filled with water or other suitable liquid sufficiently to immerse the casing $m$ and the coil $o$, and for this to be possible it is obvious that the pipe through which compressed gas is conducted to the dehydrater must be so curved that water or other liquid may not run out of the vessel or cylinder $g$ should the gas-compressor or gas-compressors employed to supply gas thereto cease working at any time. Compressed gas being forced into the dehydrater at the bottom passes upward through the interior of the casing $m$, being divided in its passage through the partitions $n$, and so brought into intimate contact with the liquid in the dehydrater and so washed, while at the same time any water-vapor present in it is condensed to the maximum tension of water-vapor at the temperature of the liquid employed in the dehydrater. The upward passage of the compressed gas through the casing $m$ also causes, as already mentioned herein, an ample circulation of the liquid employed in the dehydrater.

The dehydrater is provided with suitable means for the removal of water and any other substance which may be deposited in it—such, for example, as a drain-cock $s$—and also with means, such as cock $t$, for the supply to the dehydrater from time to time of such fresh liquid as may be desirable or necessary in order that such liquid may be kept in condition to remove water-vapor from the air passed through it.

If a single dehydrater be employed, I employ in the cylinder or vessel of such dehydrater a liquid which can be cooled without freezing to $-20°$ centigrade or $-40°$ centigrade, according to the temperature to be produced—such as glycerin, calcium-chlorid solution, petroleum, alcohol, or the like—and by preference a liquid with which water readily combines, such as calcium-chlorid solution or alcohol, so that the gas may be dried as thoroughly as possible in being passed through the dehydrater.

Instead of employing a single dehydrater I prefer to pass the gas to be operated upon through two dehydraters successively, as by connecting the outlet of the one to the inlet of the other, the first dehydrater being arranged to reduce the temperature of such gas to one temperature—as, for example, a temperature of about $0°$ centigrade—and the second dehydrater to further reduce the gas to a lower temperature—as, for example, a temperature from about $-20°$ centigrade to about $-40°$ centigrade. Such an apparatus is shown in Fig. 2. In any case in which the gas to be operated upon is made to pass through two dehydraters successively the cylinder or vessel of the first may be charged with water and cooled by means of any suitable cooling agent passed through the coil therein; but in the coil of the second dehydrater, at any rate, either sulfurous acid or carbonic acid or ammonia or any cooled saline solution or any other suitable volatile liquid is employed as a cooling agent, and in the cylinder or vessel of such second dehydrater I necessarily use instead of water a liquid not freezing at $-20°$ centigrade or $-40°$ centigrade, according to the temperature to be produced therein—such as glycerin, calcium-chlorid solution, or the like—and by preference I employ in such cylinder or vessel a liquid with which water readily combines—as, for instance, calcium-chlorid solution or alcohol—so that the gas passed through the dehydrater may be dried as thoroughly as possible. In any case in which the liquid employed in the cylinder or vessel of a dehydrater, whether employed singly or employed for the treatment of gas which is to be passed afterward through a second dehydrater or employed for the treatment of gas which has been passed through another dehydrater already, is not one with which water readily combines and there is consequently a possibility of ice being formed therein, it is requisite to provide a cock or cocks or door or doors or an opening or openings closed by a removable plug or cover or plugs or covers, so that any ice which may be formed therein may be readily removed from time to time, or to arrange that another dehydrater may be used instead thereof from time to time in order that ice formed therein may be melted in any suitable way and removed as water. In the case of two dehydraters arranged one over the other, as shown in Fig. 2, suitable means—as, for example, a ball check-valve $x$—may be employed to prevent backflow of liquid from the upper dehydrater to the lower, or any other construction or arrangement by which such backflow may be prevented may be employed. I do not limit myself to any particular means for the purpose. The purpose of thoroughly drying the gas is to prevent water-vapor from being condensed in and obstructing pipes in which the gas operated upon is further cooled or liquefied and in order that the gas issuing from the dehydrater or the last dehydrater, if two or more be employed, may be prevented from carrying solid matter into the apparatus in which it is further cooled or liquefied. For this purpose I may employ a filter $u$, as shown in Fig. 2. Such filter comprises a chamber closed at one end by a removable cover $v$, normally held in place by suitable clamping means, as shown, and within said chamber is a filtering partition $w$, comprising two perforated cylinders $x$, between which is a layer of cotton-wool or filtering-paper or other suitable filtering material $y$. The cover $v$ not only closes the end of the main chamber of the filter, but also closes the end of the inner chamber formed by the filtering-partition. Any ice carried by the air accumulates on the inside of this partition and may be removed from time to time by taking off the cover $v$.

The hereinbefore-described apparatus enables a very thorough drying of gases to be obtained and in the use of two of the hereinbefore-described apparatus in succession also enables a material economy of cold or of energy to produce cooling to be obtained.

What I claim as my invention, and desire to secure by Letters Patent, is—

1. A dehydrater for drying compressed gas, air for example, consisting in a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

2. Dehydraters in series for drying compressed gas, air for example, with the outlet of one connected to the inlet of another and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

3. Dehydraters in series for drying compressed gas, air for example, with the outlet of one connected to the inlet of another and containing liquids cooled to different temperatures and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and provided with partitions having openings for the gas to pass through in ascending within the casing.

4. Dehydraters in series for drying compressed gas air for example, each containing cooled liquid cooled to a temperature different from that in another with the outlet of one, containing liquid cooled to one temperature connected to the inlet of another containing a liquid cooled to another temperature and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

5. Dehydraters in series for drying compressed gas air for example, each containing cooled liquid and one containing liquid cooled to a lower temperature than the liquid in another with the outlet of the one containing liquid cooled to one temperature connected to the inlet of another containing liquid cooled to a lower temperature and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

6. Two dehydraters in series for drying compressed gas, air for example, with the outlet of the one connected to the inlet of the other and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

7. Two dehydraters in series for drying compressed gas, air for example, with the outlet of the one connected to the inlet of the other and containing liquids cooled to different temperatures and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and provided with partitions having openings for the gas to pass through in ascending the casing.

8. Two dehydraters in series for drying compressed gas, air for example, each containing cooled liquid cooled to a temperature different from that in the other, with the outlet of one containing liquid cooled to one temperature connected to the inlet of the other containing a liquid cooled to another temperature and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

9. Two dehydraters in series for drying compressed gas, air, for example each containing cooled liquid and one containing liquid cooled to a lower temperature than the liquid in the other, with the outlet of the one containing liquid cooled to one temperature connected to the inlet of the other containing liquid cooled to a lower temperature and each consisting of a chamber to contain liquid and furnished with an inlet for the gas to be dried and an outlet for the dried gas, a tubular coil for the passage of cooling liquid mounted in the said chamber and immersed in the liquid therein, and a casing also supported in the said chamber and immersed in the liquid therein and provided with partitions having openings for the gas to pass through in ascending within the said casing.

10. Two dehydraters in series for drying compressed gas, air for example, each containing cooled liquid and one containing liquid cooled to a temperature of about 0° centigrade and the other containing liquid cooled to a lower temperature and with the outlet of the one containing liquid cooled to a temperature of about 0° centigrade connected to the inlet of the other containing liquid cooled to a lower temperature and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

11. Two dehydraters in series for drying compressed gas, air for example, each containing cooled liquid and one containing liquid cooled to a temperature of about 0° centigrade and the other containing liquid cooled to a temperature of about from $-20°$ centigrade to $-40°$ centigrade and with the outlet of the one containing liquid cooled to a temperature of about 0° centigrade connected to the inlet of the other containing liquid cooled to the temperature of about from $-20°$ centigrade to $-40°$ centigrade and each consisting of a chamber to contain liquid and furnished with an inlet for the gas to be dried and an outlet for the dried gas, a tubular coil for the passage of cooling liquid mounted in the said chamber and immersed in the liquid therein and a casing also supported in the said chamber and immersed in the liquid therein and provided with partitions having openings for the gas to pass through in ascending within the casing.

In testimony that I claim the foregoing as my invention I have signed my name, in presence of two witnesses, this 15th day of July, 1903.

RAOUL PIERRE PICTET.

Witnesses:
HOWARD CHEETHAM,
ERNALD SIMPSON MOSELEY.